Patented Mar. 18, 1947

2,417,432

UNITED STATES PATENT OFFICE 2,417,432

LUBRICANTS

Lester W. McLennan, El Cerrito, Calif., assignor to Union Oil Company of California, Los Angeles, Calif., a corporation of California No Drawing. Application March 31, 1945, Serial No. 586,030

7 Claims. (Cl. 252—39)

This invention relates to lubricating compositions containing basic calcium soaps and has special reference to basic calcium soap greases. This application is a continuation-in-part of my copending application Serial No. 469,894, filed December 23, 1942.

The object of the invention is to obtain all of the benefits in such lubricants and greases as are peculiar to basic calcium soaps. Basic calcium soaps produce stable greases which have excellent melting point and penetration characteristics, do not require hydration, have exceptional resistance to deterioration by the action of heat and by the action of moisture including boiling water, and have unusual thickening effects on lubricating oils even at relatively low concentrations. An especially important feature is that stable greases are formed with high viscosity oils of both paraffinic and naphthenic types in contrast to the inability of some basic soaps to effect proper thickening of both types of such oils. Another object of this invention is to provide processes for the manufacture of basic calcium soap lubricants.

By the term "basic calcium soaps" as used in this application, it is meant to include products which are substantially neutral or substantially free from readily titratable excess alkalinity, at least beyond a relatively small amount and result from the reaction of a basically reacting calcium compound with a saponifiable material in amounts greater than that theoretically necessary for the formation of normal soaps, that is, the reaction of more than one equivalent of a basically reacting calcium compound with one equivalent of a saponifiable material. Preferably, it is desired to react more than 1.1 equivalents of a basically reacting calcium compound with 1.0 equivalent of a saponifiable material. Desirably, the number of equivalents of a basically reacting calcium compound reacted with 1.0 equivalent of saponifiable material is between about 1.2 and 2.0, but it may be as high as 3.0 or somewhat higher, such as 4.0, as hereinafter shown.

Examples of saponifiable materials containing high molecular weight organic acids present as such or readily derivable therefrom by saponification include fats such as tallow, lard oil, hog fat, horse fat, etc., high molecular weight organic acids such as stearic acid, oleic acid, the higher molecular weight acids resulting from the oxidation of petroleum fractions (for example, paraffin wax and mineral oil), rosin and related products, higher molecular weight naphthenic acids, sulfonic acids, etc., and saponifiable waxes such as beeswax, sperm oil, degras, etc.

The present invention resides in lubricating compositions, especially greases, which contain basic calcium soaps which are substantially neutral or substantially free from readily titratable excess alkalinity. While the invention may be extended to freely fluid lubricants, such as Diesel engine lubricating oils, containing small proportions of such basic calcium soaps, it includes more particularly the use of such basic calcium soaps in proportions to thicken lubricating oils appreciably for the purpose of producing liquid greases or solid greases of varying consistencies. More particularly, the invention resides in mineral oil lubricants containing thickening proportions of basic calcium soaps wherein the number of equivalents of basically reacting calcium compound reacted with one equivalent of saponifiable material is between about 1.2 and 3.0, although it extends to the upper limit above indicated, e. g., 4. Especially stable soaps have been formed by reacting between about 1.3 and 1.9 equivalents of a basically reacting calcium compound with 1.0 equivalent of saponifiable material. The invention also comprises the method of making such lubricants.

The invention also includes the use of basic calcium soaps to produce lubricants employing high viscosity mineral oils, e. g., 50 or 70 SAE grade, or even bright stocks, as well as lower viscosity mineral oils, e. g., 20 or 30 SAE grade. Good lubricants may also be produced from the very low viscosity "bottoms" fraction obtained by fractionating heavy alkylates obtained from alkylation processes in the manufacture of motor fuels from certain stocks, where said bottoms have a viscosity in the order of that of spray oils or even lighter.

In connection with the present basic calcium soaps, it has been found that under appropriate conditions it is possible to react 1.0 equivalent of saponifiable material (as determined by its saponification number) with more than 1.2 and up to about 2.0 equivalents (or even up to as high as 4.0 equivalents as above indicated) of a basically reacting calcium compound, such as calcium hydroxide, to produce a material which is substantially neutral or substantially free from readily titratable excess alkalinity.

Although I do not wish to be limited to the theories advanced herein, the net reaction which appears to occur and which results in the formation of the improved greases forming the subject of this invention is the oxidation of a portion of the saponifiable material and reaction of the excess basically reacting calcium compound with the acidic products formed. It is likely that the initial reaction which occurs is the formation of a normal calcium soap by the saponification of the saponifiable material with an equivalent amount of the basically reacting calcium compound. Subsequently, a portion of the soap is oxidized by oxygen and the excess basically reacting calcium compound present combines with the acidic materials formed. The character of the oxidation reaction which occurs is undoubtedly influenced by the presence of the excess basically reacting calcium compound and possibly by the presence of a polar solvent such as water or glycerine. In this connection evidence has been obtained indicating that in the presence of a polar solvent such as water, normal calcium soap forms a complex with calcium hydroxide. This complex has a different solubility in oil than normal calcium soap alone, but still contains the calcium hydroxide in a readily titratable form. It is probable, therefore, that the material actually undergoing oxidation is the normal calcium soap-calcium hydroxide complex.

As a specific example of a basic calcium soap grease of this invention, 50 grams of tallow fatty acids (0.18 gram equivalent), 5 grams of glycerine, 9.5 grams of calcium oxide (0.34 gram equivalent), and 50 grams of water were mixed in a beaker and while continuing agitation the material was heated to 300° F. to effect saponification and remove the major portion of the water. The resulting dry powder was then maintained at 350° F. for two hours at the end of which time it was determined that only a small amount of titratable alkalinity remained. Twenty grams of the latter basic calcium soap was mixed with 80 grams of a naphthenic-type oil having a viscosity of 110 Saybolt Universal seconds at 210° F., the mixture heated to 400° F., subsequently cooled to room temperature and finally worked. The final product analyzed for 16.5% by weight of calcium soap and an amount of free alkalinity equivalent to 0.2% by weight of free calcium hydroxide. The ratio of equivalents of basically reacting calcium compound to equivalents of saponifiable material was 1.89. The substantially anhydrous grease was transparent, had a smooth buttery texture, an A. S. T. M. penetration at 77° F. of 215, and an A. S. T. M. dropping point of 365° F.

As a second example, 50 grams of tallow fatty acids (0.18 gram equivalent) and 14 grams of calcium hydroxide (0.38 gram equivalent) were mixed in a beaker and heated to effect saponification of the acid and removal of the water. Heating was continued to a temperature of 350° F. and maintained at this value for two hours. At the end of this time the product contained only a trace of free alkalinity. Ten grams of the product was mixed with 30 grams of a naphthenic-type oil having a viscosity of 600 Saybolt Universal seconds at 100° F. and the mixture heated to 480° F. Subsequently the material was cooled to room temperature and worked, yielding a transparent grease having a smooth buttery texture, an A. S. T. M. penetration at 77° F. of 240 and an A. S. T. M. dropping point in excess of 300° F. The product, as indicated by analysis, contained 22.4% by weight of calcium soap, an amount of free alkalinity equivalent to 0.02% by weight of calcium hydroxide, and the ratio of equivalents of calcium hydroxide to saponifiable material was 2.11.

Other basic calcium soap greases have been prepared by reacting a higher or a lower number of equivalents of a basically reacting calcium compound with one equivalent of a saponifiable material, but those greases in which between about 1.3 and 1.9 equivalents of a basically reacting calcium compound have been reacted with one equivalent of saponifiable material appear to have outstanding stability.

It may be noted that the above greases were not rehydrated after formation of the basic soap. This is characteristic of the basic calcium soap greases of this invention. Normally they do not require hydration, although they may be hydrated if desired. The latter may be accomplished by cooling the substantially neutral mixture which has been cooked at the indicated high temperatures of about 450° F. to a temperature of about 200° F., adding a slight excess of water over the amount desired in the final product, heating to obtain the final desired water content and then, if required, adding additional oil and cooling.

It has also been noted that even though the final grease is to be substantially anhydrous, a product of improved characteristics can often be obtained by adding a small amount of water, for example, in the range of 0.1 to 3.0% by weight or even as high as 10% by weight of the grease charge at a suitable temperature and subsequently increasing the temperature to effect substantially complete dehydration. The grease may be at a temperature of about 210° F. or less when such water additions are made, although temperatures as high as 230° F. or even as high as 300° F. or higher may be used, and subsequent dehydration has been accomplished by heating to temperatures in the neighborhood of 250° F. or higher when necessary. With certain saponification reagents the greases produced by the processes of the present invention have a granular appearance, but by employing the hydration-dehydration technic, products of smooth buttery texture are obtained, often accompanied by an increase in consistency and melting point. Further improvements in grease texture can likewise usually be obtained by working the grease at temperatures below about 200° F. and preferably below about 150° F. prior to final packaging.

Usually the hydration-dehydration technique to produce a final substantially anhydrous grease is most effective on a slightly acidic basic calcium soap grease. Subsequently the grease can be adjusted to the desired acidity or alkalinity by the addition of calcium hydroxide or fatty acid, or other equivalent materials, as the case may be.

The basic calcium soap greases of this invention are unusual not only in their stability, their excellent melting point and penetration characteristics, and in the fact that they do not require hydration, all of which are shown in the above examples, but also in their exceptional resistance to deterioration by the action of heat and of moisture or even boiling water. They also have very unusual thickening action on oils even in relatively low concentrations, and form stable greases with either low or high viscosity lubricating oils of either paraffinic or naphthenic character. Also they may be used with lubricating fractions as widely different as isoparaffinic material of relatively low viscosity produced by alkylation processes as hereinafter mentioned, or aromatic extracts produced by solvent extraction of lubricating oils of high or low viscosity, or synthetic lubricants of olefinic, aromatic or saturated character.

The formation of the basic calcium soaps of this invention generally requires high temperatures, preferably in the region of 400° F. to 550° F., although they can be formed over a wider temperature range, such as about 300° F. to 600° F. The type of saponifiable material used is not critical since basic calcium soap greases are less sensitive to the type of soap stock employed than are some other basic soap greases. The basically reacting calcium compound is preferably calcium hydroxide or slaked lime, although in many instances calcium oxide or other similar material may be employed. The basically reacting calcium compound may be added as a powder, in small granules, or as an aqueous or oil slurry as desired. As has been indicated, the ratio of equivalents of basically reacting calcium compound to equivalents of saponifiable material reacted may be as high as 3 or somewhat higher, but it is desirably between about 1.3 and 1.9. The basic calcium soap formation is preferably carried out in the presence of part of the lubricating oil to be used in the finished grease, although the basic soap can be formed in the absence of oil or inert low boiling solvents may be used along with the saponifiable material and basically reacting calcium compound under pressure and subsequently evaporated to leave a pure basic calcium soap. The latter may then be added to oil to form the greases of this invention. Basic calcium soap formation is preferably carried out in an open kettle allowing water to be evaporated as desired, but under any conditions in the presence of air or oxygen.

The amount of basic calcium soap to be incorporated in the greases of this invention may be from about 5% up to about 50%, although even higher concentrations may be used for certain special applications. These soaps may also be used in smaller proportions to produce liquid greases and other liquid lubricants, such as lubricating oils for internal combustion engines, especially Diesel engines. The soap concentrations in this case will usually be below about 5%, such as about 1% or from about 0.5% to 2.0% or 3.0%.

Normally in reacting a saponifiable material with an excess of a basically reacting calcium compound the extent of the oxidation reaction is controlled so as to produce a final grease which is substantially neutral or free from readily titratable excess alkalinity, that is, one having a free acid or free alkali content less than about the equivalent of 5.0 mg. KOH per gram of soap present. In other words, the oxidation is so controlled that it results in the formation of at least about 0.1 equivalent of acidic oxidation products and preferably about 0.2 to 1.0 equivalent of acidic oxidation products or even as high as about 3.0 equivalents of acidic oxidation products. The progress of the oxidation reaction can be followed by periodically titrating to determine the proportion of calcium hydroxide present in the reacting mass which has not combined with acidic oxidation products and when this has reached the desired value, the oxidation may be arrested such as by rapidly cooling to a temperature below about 250° F. to 300° F. While it is preferred that the soaps in greases of this invention be substantially neutral, they may contain a small amount of free acidity or alkalinity. The finished grease may have a free alkali content calculated as calcium hydroxide as high as about 0.5% by weight of grease or a free acid content equivalent to about 2.0 mg. KOH per gram of grease. A grease having a free acid content may be obtained by either continuing the oxidation to produce an excess of acidic reaction products over that required to neutralize the free calcium hydroxide or the oxidation reaction can be stopped at an earlier stage, such as while free calcium hydroxide is still present, and fatty acid or other suitable acidic materials added in sufficient quantity to give a grease of the desired free acid content. In order to obtain a free alkali content the oxidation can be stopped at an intermediate point or it can be continued to produce a substantially neutral or even acidic soap and the desired excess of free calcium hydroxide then added.

Free alkalinity is measured in accordance with A. S. T. M. method of test No. D–128–40, section 18, except that titration is conducted in the cold and the titration is made directly with standard HCl solution rather than by adding an excess of HCl solution and then back titrating with alcoholic potassium hydroxide solution. Free acidity is measured in accordance with A. S. T. M. method of test No. D–128–40, section 20. Briefly, the methods of test employed are as follows:

A 10-gram sample of the grease is weighed to the nearest tenth of a gram into a 250 ml. Erlenmeyer flask. To the flask is then added 75 ml. of petroleum ether and 50 ml. of 95% alcohol containing phenolphthalein indicator, the alcohol having been previously made neutral as indicated by the phenolphthalein indicator. The flask is stoppered and shaken vigorously in the cold until the grease has completely disintegrated and no lumps remain. The solution is then allowed to settle and free alkali or free acid, as observed by the color of the alcoholic layer, is titrated carefully in the cold to the phenolphthalein end point with 0.5 normal HCl or alcoholic KOH, as required. Free alkalinity is calculated in terms of calcium hydroxide; free acidity in terms of oleic acid or acetic acid. Free alkalinity and free acidity may also be expressed in terms of equivalent mg. of KOH per gram of grease or soap as desired.

Materials other than soaps may also be added to the greases of this invention, such as water, alcohols and other solvents, anti-oxidants, fillers, etc., as desired. An especially hard grease, for example, was prepared by the incorporation of an oil containing about 50% of asphalt instead of the usual lubricating oil to yield a grease composition similar to that of the second example above. Additions of petrolatum and solvent extracts from lubricating oil stocks have been helpful in some instances.

In addition to using both light and heavy mineral lubricating oils to make greases hereof, I may also employ as the oil the light lubricating-type oil which is recovered as heavy bottoms from the distillation of residuals obtained in modern alkylation processes employed in making modern alkylated motor fuels from some stocks. In some such processes the mentioned residuals are recovered in fairly large proportions. About 80% thereof is then distilled off to be used for various purposes, thereby leaving about 20% of the heavy alkylated bottoms mentioned. This 20% fraction may be further cut to yield lighter and heavier fractions. These fractions have viscosities in the order of that of spray oil and of very light lubricating oil, e. g., SAE 10. In view of the high thickening properties of the basic calcium soaps hereof, such heavy alkylated bottoms may be used as the lubricating fractions, especially where a light oil is desirable for a given fluid or grease-like product having a low pour point.

The described bottoms may, for example, be recovered from the sulfuric acid alkylation process described in the "Refiner" for September 1941, vol. 20, page 378. Suitable bottoms are obtained, for example, after recovery of the motor fuel alkylate. Some stocks yield larger amounts of such alkylate bottoms than others. These bottoms may in turn be fractionated for the present purpose.

Other modifications of this invention will be apparent to those skilled in the art.

I claim:

1. A lubricating composition comprising mineral oil and calcium soap complex, in which the calcium soap complex is made by reacting in the presence of oxygen in excess of one equivalent of a basically reacting calcium compound with one equivalent of a saponifiable material to yield said calcium soap complex containing a ratio of equivalents of calcium to equivalents of saponified high molecular weight organic acids between about 1.1 and 4 and being substantially free from readily titratable excess alkalinity.

2. A lubricating composition comprising mineral oil and calcium soap complex, in which the calcium soap complex is made by reacting in the presence of oxygen in excess of one equivalent of a basically reacting calcium compound with one equivalent of a saponifiable material to yield said calcium soap complex containing a ratio of equivalents of calcium to equivalents of saponified high molecular weight organic acids between about 1.1 and 4, said composition being substantially anhydrous and being substantially free from readily titratable excess alkalinity.

3. A lubricating composition according to claim 1, in which the ratio of equivalents of calcium to equivalents of saponified high molecular weight organic acids is between about 1.3 and 1.9.

4. A lubricating composition according to claim 1, wherein the mineral oil is a high viscosity mineral lubricating oil of 50 SAE and higher.

5. A lubricating composition according to claim 1, wherein the mineral oil is a low viscosity alkylation bottoms fraction.

6. A lubricating composition according to claim 1, wherein the mineral oil is a viscous mineral lubricating oil containing asphalt.

7. A method of preparing lubricants comprising reacting a saponifiable material with more than one equivalent of a basically reacting calcium compound in the presence of mineral oil and in the presence of oxygen at temperatures between approximately 400° F. and 550° F. to yield a calcium soap complex, cooling and adding additional mineral oil, said calcium soap complex being substantially free from readily titratable excess alkalinity and containing a ratio of equivalents of calcium to equivalents of saponified high molecular weight organic acids in excess of about 1.1.

LESTER W. McLENNAN.

REFERENCES CITED

The following references are of record in the file of this patent:

UNITED STATES PATENTS

| Number | Name | Date |
|---|---|---|
| 2,033,148 | Ott et al. | Mar. 10, 1936 |
| 2,154,383 | Ott et al. | Apr. 11, 1939 |
| 2,197,263 | Carmichael et al. | Apr. 16, 1940 |
| 2,303,256 | Camelford | Nov. 24, 1942 |

FOREIGN PATENTS

| Number | Country | Date |
|---|---|---|
| 3,603 | British | 1873 |

OTHER REFERENCES

McLennan, Methods of Compounds Barium Greases, Their Properties, Uses, and Future, Article in the National Petroleum News, April 5, 1944, pages R–234, R–236, R–238, and R–239.